United States Patent
Stainback et al.

(10) Patent No.: US 10,834,144 B2
(45) Date of Patent: Nov. 10, 2020

(54) HUB AND AGENT COMMUNICATION THROUGH A FIREWALL

(71) Applicant: Itron, Inc., Liberty Lake, WA (US)

(72) Inventors: Aaron Stainback, Rolesville, NC (US); Christopher Higgins, Wake Forest, NC (US)

(73) Assignee: Itron, Inc., Liberty Lake, WA (US)

( * ) Notice: Subject to any disclaimer, the term of this patent is extended or adjusted under 35 U.S.C. 154(b) by 199 days.

(21) Appl. No.: 15/782,253

(22) Filed: Oct. 12, 2017

(65) Prior Publication Data

US 2018/0109563 A1    Apr. 19, 2018

Related U.S. Application Data

(60) Provisional application No. 62/408,041, filed on Oct. 13, 2016.

(51) Int. Cl.
*G06F 15/16* (2006.01)
*H04L 29/06* (2006.01)
*H04L 29/08* (2006.01)

(52) U.S. Cl.
CPC .......... *H04L 65/105* (2013.01); *H04L 63/029* (2013.01); *H04L 63/0428* (2013.01); *H04L 67/025* (2013.01); *H04L 67/1036* (2013.01); *H04L 67/40* (2013.01); *H04L 63/0218* (2013.01)

(58) Field of Classification Search
None
See application file for complete search history.

(56) References Cited

U.S. PATENT DOCUMENTS

| | | | | |
|---|---|---|---|---|
| 2002/0156894 | A1* | 10/2002 | Suorsa | G06F 8/61 709/226 |
| 2005/0262359 | A1* | 11/2005 | Palecek | H04L 63/0428 713/185 |
| 2006/0230152 | A1* | 10/2006 | Matsushima | H04L 63/029 709/226 |
| 2007/0061460 | A1* | 3/2007 | Khan | H04L 63/029 709/225 |
| 2012/0265976 | A1 | 10/2012 | Spiers et al. | |
| 2014/0068737 | A1* | 3/2014 | Micucci | H04L 63/08 726/7 |
| 2015/0026767 | A1* | 1/2015 | Sweet | H04L 63/20 726/1 |
| 2015/0163199 | A1 | 6/2015 | Kailash et al. | |
| 2016/0315922 | A1* | 10/2016 | Chew | H04L 63/061 |

(Continued)

OTHER PUBLICATIONS

PCT Search Report and Written Opinion dated Jan. 4, 2018 for PCT Application No. PCT/US17/56325, 11 pages.

*Primary Examiner* — Phyllis A Book
(74) *Attorney, Agent, or Firm* — Lee & Hayes, P.C.

(57) ABSTRACT

Hub and agent techniques allow safe command execution and data retrieval through firewall(s). In an example, cloud-based server of a company communicates with a plurality of agent applications operating on a remote customer's site. Using hub-and-agent techniques, cloud-based systems are able to direct the agents to perform functions for, and add value to, on-premises servers at remote customer locations. Secure communications techniques are introduced, allowing the hub server in the cloud to securely communicate with, and receive data from, the agents operating behind a firewall at a remote, on-customer-premises server.

20 Claims, 6 Drawing Sheets

(56) References Cited

U.S. PATENT DOCUMENTS

2016/0342665 A1* 11/2016 Lane .................... G06F 3/0484
2017/0302458 A1* 10/2017 Berger ............... H04L 63/0428
2017/0318012 A1* 11/2017 Kim .................... H04L 67/306

* cited by examiner

HUB AND AGENT COMMUNICATION THROUGH A FIREWALL

This patent application claims priority to U.S. Provisional Application No. 62/408,041 titled "Hub and Agent Communication Through a Firewall", filed on Oct. 13, 2016, commonly assigned herewith, and hereby incorporated by reference.

BACKGROUND

It is common for one company to have servers that are located in the internet and/or "cloud" with respect to a customer's computing devices, which may be located on-premises, at the customer's site. The company may need to support the customer by securely executing commands and retrieving data from the customer, while minimizing and/or eliminating the involvement of information technology (IT) personnel and without modification of the customer's firewall rules.

In an example of known techniques, a type of reverse proxy may be created, wherein an agent of the company, operating on computing devices at the customer's site, "phones home" back to a server of the company. This action creates a connection that is left open so that any arbitrary command can be sent down from the cloud to the customer. However, there are several disadvantages to these techniques.

In particular, such long-lived connections are usually terminated by most corporate firewalls as a security concern. Even when trying to use existing open outgoing ports like 443 from the customer's agent, there may be problems related to packet inspection of modern (e.g., stateful) firewalls. Such inspections will notice the traffic does not meet the normal traffic shape and reject and close connections.

In a second problem, such techniques allow the company's computing device in the cloud to send an arbitrary command to the customer's site. Such commands introduce a new attack vector, which malicious users may exploit.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

DETAILED DESCRIPTION

Overview

Figure 1:
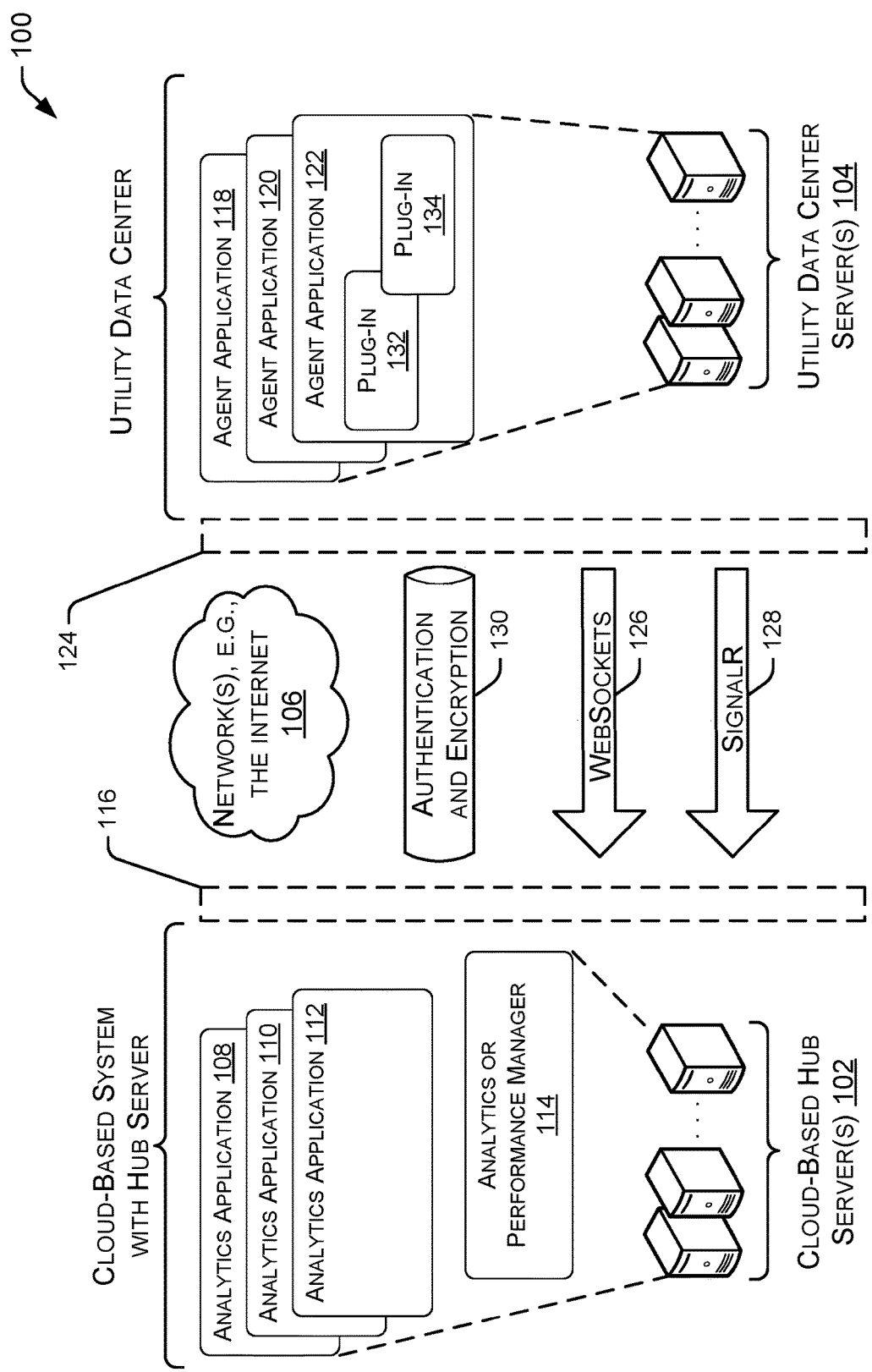
FIG. 1 is a block diagram showing a first example relationship between a cloud-based entity and a utility company data center.

Hub and agent techniques allow safe command execution and data retrieval through firewall(s). For example, the techniques described herein provide the ability for a remotely located, e.g., cloud-based, server to securely and reliably execute commands on, and retrieve data from, a remote customer's site. Accordingly, cloud-based systems are able to perform functions for, and add value to, on-premises servers at remote customer locations. The techniques minimize and/or eliminate involvement of information technology (IT) personnel at the customer's site and minimize or obviate the need for firewall rule modification. In a smart electrical grid application, secure and robust techniques provide ways to retrieve data regarding electrical measurements, network trends, meter measurements, system performance, etc. In an internet of things (IoT) environment, the techniques allow a hosted/cloud analytical system to monitor and direct devices associated with backend server farms (e.g., remote servers that may be located on-premises at the customers). The techniques also include the ability to send one- and two-way commands from the cloud to IoT devices and/or associated backend server farms that may be located on-premises at the customer.

In an example of the techniques described herein, a hub server may be configured to send commands to, and receive data from, remotely located agents operating on remote customer's servers (either on-premises or also cloud located). Accordingly, a hub-and-agent technology is introduced that extends the TCP-based, full-duplex WebSocket protocol.

In an example, the hub-and-agent technology may utilize WebSockets. WebSockets are related to the HTTP standard, and use port 80 (unsecure) or port 443 utilizing secure socket layer (SSL)/transport layer security (FLS). These ports may be open for outgoing traffic on a significant number of corporate firewalls, to thereby allow users to browse corporate web pages or access applications located within those firewalls. The use of port 443 as an outgoing connection allows an agent of a hub (the hub's agent operating on a customer's server) to communicate securely over an SSL/TLS connection. The secure connection is beneficial because a firewall (e.g., a stateful firewall) that performs packet inspection can see a WebSocket handshake on port 80 and decide to reject the connection. Since the handshake is encrypted when using SSL/TLS at port 443 it is not visible to the firewall and for all practical purposes it looks like a completely normal HTTP connection, even though it is a connection being held open by the client (operating on the customer) to allow the (remote hub) server to send commands.

In an example of the protocol, the agent operating at the customer's site sends an 'Establish Connection' message thereby opening a WebSocket at the client/customer to the hub. The hub then sends back a 'Connection Successful' message (or a 'Rejected' if permission is denied, e.g., due to certification issues, etc.). Assuming success, the agent will periodically check (e.g., every minute or other period) to make sure the connection—from the agent at the customer to the company at the hub—is still open. If the connection closes, the agent will re-establish the connection. While the connection is open, a function of the agent is to wait for, and receive, commands from the hub. Accordingly, a connection is available over an extended period of time, even in an environment using modern firewall protection.

The techniques of hub-and-agent technology also address the problem that such an open connection may allow bad actors to exploit an attack vector wherein escalation of privilege results in transmission of arbitrary commands for execution within the customer's firewall. In an example of the techniques described herein, commands have been represented in a format comprising "name, parameters" pairs. In some examples of the hub-and-agent technology, security is provided by requiring that the actual implementation of all commands must operate within the customer's server/firewall in association with the agent operating in that location. In such an example implementation, none the commands and/or their definition, implementation and/or specifics live in the cloud at the hub. In this example of the hub, only a reference to the agent's commands exists, such as references to one or more paired command name and associated command parameters. These techniques allow the customer, due to the customer's control over the agents operating on the customer's site, to be in control of what commands are allowed and the specifics of their implementation. Even if the hub server in the cloud becomes compromised, it is impossible for a malicious user to send new, modified and/or unexpected commands. Only commands that already exist at the agent can ever be called. This reduces any risk of privilege escalation, and provides security that is under control of the customer and that is consistent with such customer's expectations.

Command Families

In an example, a uniform resource locator (URL) suffix may be used to represent different types of commands. In representative but not limiting examples, a URL of the format https://localhost/remoteSQL can be used to represent different types of remoteSQL (remote SQL) commands. The URL may be hosted by the hub server, which receives a request from the agent to form a secure connection. The hub server may then use the secure connection to send commands to the agent(s) and receive data and information from the agent(s). In an example installation, about forty different remote SQL commands may be configured at the customer's server. However, in other examples, any number of more or less commands may be used as needed to implement functionality of the services. Any of these commands may be referenced by sending the name of the remote SQL command to the URL for that type of command. Additionally, in some examples, web service commands and other types of commands may be utilized with their own URL. Using these basic protocol rules to define any command can be accomplished in a safe, secure, and firewall-compatible manner.

Thus, command family can be represented by different resource URIs. The hub server (e.g., data hub server 216 of FIG. 2) may host the URIs for each of the command families. The agent (operating, for example, on server 228 in FIG. 2) will then be able to connect to each of the URIs for which it has commands of that family type. If an agent does not have commands belonging to a certain family then there is no need for it to connect to that URI on the hub server—to do so would be a waste of resources. Use of command families also gives an additional way the system can be scaled. Scaling may be performed by addition of command families and/or alterations to one or more command families. This allows dedication of more resources to certain types of commands.

Example command families are shown below, together with example of what their URI and command object could look like. The representative commands show both XML and JSON example terminology; however, alternatives languages could be used, such as a binary format. An infinite number of command families that could be conceived of, allowing for a wide range of applications of the technology (e.g., utility metering, internet of things, etc.) to which the command families and their associated agents are to be put.

In a first specific example, remote structured query language (SQL) commands may be used to execute SQL statement(s) against a remote database server that lives on-premises (at the customer) and return the result to the cloud (e.g., to the company). The commands do not have to be actual SQL commands because the actual implementation of the command is at the agent (e.g., at plug-in 132 or 134 in FIG. 1) which does include actual SQL statements. The hub server only needs to send down the name of the command and any parameters. This example type of command illustrates the safety of the hub server and remote agent technology, as compared to conventional approaches. Since a hacker is not able to send to the agent an arbitrary (i.e., actual) SQL command(s) the attack surface area is greatly reduced.

In an example SQL example, a uniform resource identifier (URI) is shown as: https://hubserver.com/remoteSQL. In a representative command Java script object notation (JSON) format, the command sent to the agent is:

```
{
    "remoteSQL": {
        "commandName": "SQLCMD1",
        "commandInstanceId": "234234",
        "dateParameter": "2015-06-26",
        "numberParameter": "26",
        "boolParameter": "true"
    }
}
```

The command XML format would be:

```
<remoteSQL>
    <commandName>SQLCMD1</ commandName>
    <commandInstanceId>234234</ commandInstanceId>
    <dateParameter>2015-06-26</ dateParameter>
    <numberParameter>26</numberParameter>
    <boolParameter>TRUE</ boolParameter>
</ remoteSQL>
```

In a second specific example, a remote Web Service (a service by a device, for another device, and over the web) call can be performed. A Web Service is an older web technology usually XML based and using a SOAP schema. These were kind of generation 1 web technology, and include technologies including windows communication foundation (WCF) from Microsoft. Many applications on-premises still use this technology heavily. For this reason, a good command family to include is remote web service calls. This will allow an application in the cloud to execute a two-way web service command on a system on-premises though the hub and agent.

The example URI is: https://hubserver.com/webService
And the command in XML format is:

```
<webService>
    <commandName>WEBCMD01</ commandName>
    <commandId>2342354</ commandId>
    <startDate>2015-06-26</ startDate>
    <endDate>2015-06-26</ endDate>
```

```
        <dataType>Customer</dataType>
    </webService>
```

In a third specific example, a representational state transfer (REST) is very similar to Web Services except it's much simpler, light weight, and focuses on https verb to accomplish it tasks. REST provides interoperability between computer systems on the internet. Therefore, it is much more resource oriented than service oriented like web services. REST also usually JSON based instead of XML based like web services. ASP.Net WebAPI is an example of this generation 2 web technology from Microsoft. This type of technology is everywhere and it is therefore a good idea to include it in a command family. The example allows an application in the cloud to execute a two-way rest call on a system on-premises through the hub and agent.

The example URI is: https://hubserver.com/rest
And the command in JSON format is:

```
{
    "rest": {
        "commandName":
        "RESTCMD36",
        "correlationId": "984353",
        "beginRange": "20",
        "endRange": "150",
        "hasIssue": "true"
    }
}
```

In a fourth specific example, a remote file transfer allows transfer of an on-premises file to the cloud. However, if any file name is allowed, the command this can become an attack vector wherein the attacker could send in any file name to transfer. For this reason, a directory could be controlled by the agent so that the hub is only allowed to send down transfer requests if they exist in the folder(s) allowed by the agent.

The example URI is: https://hubserver.com/fileTransfer
And the command in JSON format is:

```
{
    "fileTransfer": {
        "commandName": "FILECMD01",
        "commandId": "64934",
        "fileName":
        "c:\allowedFolder\temp.txt"
    }
}
```

In a fifth specific example, WebHooks is a way of subscribing to the data changes behind a REST service. In this command mode, a single command allows subscription, but data will continue to flow until unsubscribed. This allows an application in the cloud to subscribe to changes in a system on-premises.

The example URI is: https://hubserver.com/webHooks
And the command in JSON format is:

```
{
    "webHooks": {
        "commandName": "WEBHOOKSCMD42",
        "subscriptionId": "a4c6880b-c012-40ce-a6bb-f6a54a96f3ea",
        "action": "Subscribe"
```

```
    }
}
```

Example Hub-and-Agent System

In the discussion below, a "company" refers to an enterprise, entity and/or organization offering or performing a hosted/cloud service. A customer refers to an enterprise, entity and/or organization that is using the company's cloud service. Example services include smart utility grid data collection and analytics (e.g., electricity, water, gas, oil, etc.), point-of-sale financial services, warehousing and product management, accounting, banking, and others. The company may provide a cloud-based system that communicates with a plurality of agents running on the on-premises servers of the customer. The "hub" terminology refers to a server located in the cloud that communicates with a plurality of agents that are located on-premises at a customer. Accordingly, the "hub" is central (e.g., in a logical sense) with respect to the many agents it directs. Each customer, in turn, may be configured with a plurality of agents, each in communication with the hub regarding one or more commands or procedure calls that are available for use by applications running on the hub (or servers in communication with the hub). By using the hub server on its cloud-based system, the company may provide services to the customer by executing commands and gathering data from the customer's on-premises computing devices.

In an example, the hub may listen for secure WebSocket connections on port 443, thereby connecting with other devices over the internet. While both the use of WebSockets and port 443 can be interchanged for other ports and/or technologies, the example describing use of secure WebSockets on port 443 requires little or no firewall changes at servers used by the customer. All cloud and hosting facilities either already have port 443 incoming open, or it's very little effort to open it to incoming transmissions, since this port is currently the most commonly used and allowed by firewalls.

Agents (i.e., software operating on the company's hosted or cloud network) may be configured to listen for commands sent by applications running on the hub. Agents, listening at each of the company's server(s) (or at each of a plurality of companies' servers), allow for applications written and/or operated by the company to communicate through the hub, and then through an agent, and ultimately communicate with device(s) that are on-premises at the customer's location. In a smart electrical grid example, an analytics application running on the hub and associated with electrical use data collection and analytics may utilize agent(s), running on the customer's server(s) to execute commands on, or obtain data from, the customer's servers. Accordingly, the hub provides an interface for all cloud-based analytics and management software applications and/or products to communicate with devices or applications that are on-premises at the customer. The cloud-based analytics and management products, databases, etc., may be made by the company or third-party companies. Similarly, IoT devices made by the company or third-parties, etc.

The customer may run one or more services provided by the company (i.e., an agent) on their on-premises devices such as server farms, databases, IoT devices, meters, etc. In some example installations, agents may be designed to have "small footprint" characteristics, and therefore may not require many resources from the device/server it runs on.

In example operation, one or more agents may continuously, frequently and/or periodically try to establish a connection over a secure WebSocket port 443 back to the hub. In some examples, the agent may store the hub's address, while the Hub may not have and/or use a public address for the agent(s) in circumstances wherein it is the agent's responsibility to make the connection to the hub. Once the connection is established, the agent will keep it open (e.g., while the company's device, on which the agent runs, is operating). The agent may additionally monitor the health of the connection. If the connection goes down for any reason the agent may enter a state wherein it continuously or repeatedly tries to reconnect. Again, while use of WebSockets and port 443 are disclosed, these selections could be replaced by alternative technologies and ports. However, they are available on almost every customer's device that supports internet browsing. Accordingly, the selection of WebSockets and port 443 suggests availability of an outgoing open connection and that few if any firewall changes will be required.

Agents may also be configured with a set of commands as indicated by particular design requirements. Agent may include command sets for retrieving data, communicating with other systems, devices, databases, etc. Some systems, devices and/or databases could be made by the company and some could be third-party products. Any desired command could be packaged with an agent. Additionally, by locating the command at the agent, which is located on the customer's server and not located in the cloud at the hub, the customer is better able to control the customer's security. By locating the commands in agents at the customer's site, even if a bad actor is in control of resources at the hub, the customer is better protected. In particular, the hub is only capable of sending names of commands and associated parameters to an agent. Upon receipt of a command, the agent is responsible for actually confirming that command exists, that the command is valid, that the command is allowed to be executed, for determining the statements that comprise the command, and for executing the statements. The agent may then return a success code and/or any resultant data. This eliminates an attack vector wherein new commands are constructed in the cloud and send down by a malicious user (e.g., a user that has compromised the hub). Since the protocol described herein does not allow for new commands to be sent from the hub, and only for the hub to call existing commands on the agent, then it is not possible for an attacker to send down a new command that does not already exist in an agent.

Example Hub-and-Agent Configurations

FIG. 1 shows an example system 100 having company and customer servers. In the example shown, a cloud-based "hub" server(s) 102 communicates with the customer or utility data center server(s) 104 over a network 106, such as the internet. The hub server 102 may be considered to reside in the cloud, from the perspective of the utility data servers 104. The hub server 102 directs the operation of a plurality of agents at the utility data center 104. In one example, the agents may be located on a single server, and interact with applications running on other servers. In an alternatively example, the agents may be distributed among a plurality of servers, with each agent conveniently located with respect to applications with which it is associated.

The company or hub server 102 may include a number of applications, including representative example analytics applications 108, 110, 112. The applications may request the hub server to send commands to agents operating on the utility data center 104. An analytics or performance manager 114 may also be provided, to receive and process information from the various analytics applications. The hub server 102 may be protected by a firewall 116.

The customer or utility data server 104 may include a plurality of agent applications, including representative agents 118, 120, 122. The utility data server 104 may be protected by firewall 124.

WebSockets 126 or SignalR 128 technologies may be used to provide authentication and encryption 130 and communication between the hub server 102 and the utility data center server 104.

In example operation, agent services 118-122 run on-premises, at the data center 104. The agents may be located on a single server for reasons of security, or distributed among servers based on the locations of applications with which they are associated. The agents 118-122 may communicate with the hub via WebSockets 126, using port 443. Mutual certificate authentication 128 may be used to establish a trust relationship between the servers 102, 104. An agent initiates the connection over port 443 using an encrypted handshake that renders the connection invisible to the firewall 124 in terms of stateful packet inspection. The agents 118-122 keeps the connection alive, reconnecting as necessary. The connection is not initiated from the hub 102, and the hub is not given any navigation or credential information about the location of the agents, other than the trusted certificate. The agents are configured locally by the customer (owner/manager of utility data server 104), and include only commands and programming statements that are allowed by information technology professionals at the utility data server. The agents 118-122 wait for commands from the hub (e.g., from analytics applications 108-112) and perform those commands as requested.

The commands, made at the hub 102 and received at the utility data center 104, may be defined according to a protocol agreed on by company and customer. The commands can only be called via the hub 102, over the trusted connection, thereby insulating the utility data center 104 even from inside attacks that attempt to execute the commands associated with one or more agents. In an example, the commands are defined by a command name plus a parameter name/value tuple. Programming statements that actually execute the commands are performed by the agents, located on the utility data server 104, and are approved by IT professionals at that location. The hub 102 is aware only of the command definition, and the specific programming used to effect the command, in the agent at the utility data center 104, is unknown at the hub server.

In an example, an agent application may include one or more executable command plug-ins 132, 134, which may be called by commands from the remote hub server (e.g., located at 102). The company may provide the customer with an agent having a plurality of executable command plug-ins. IT professionals of the customer may review the plug-ins individually, and assess their merit and any security risks associated with their operation. At the discretion of the customer, one or more executable command plug-ins may be removed from any agent operable on the customer's servers. Accordingly, the number of plug-ins may be adjusted according to the desires of the customer.

Figure 2:
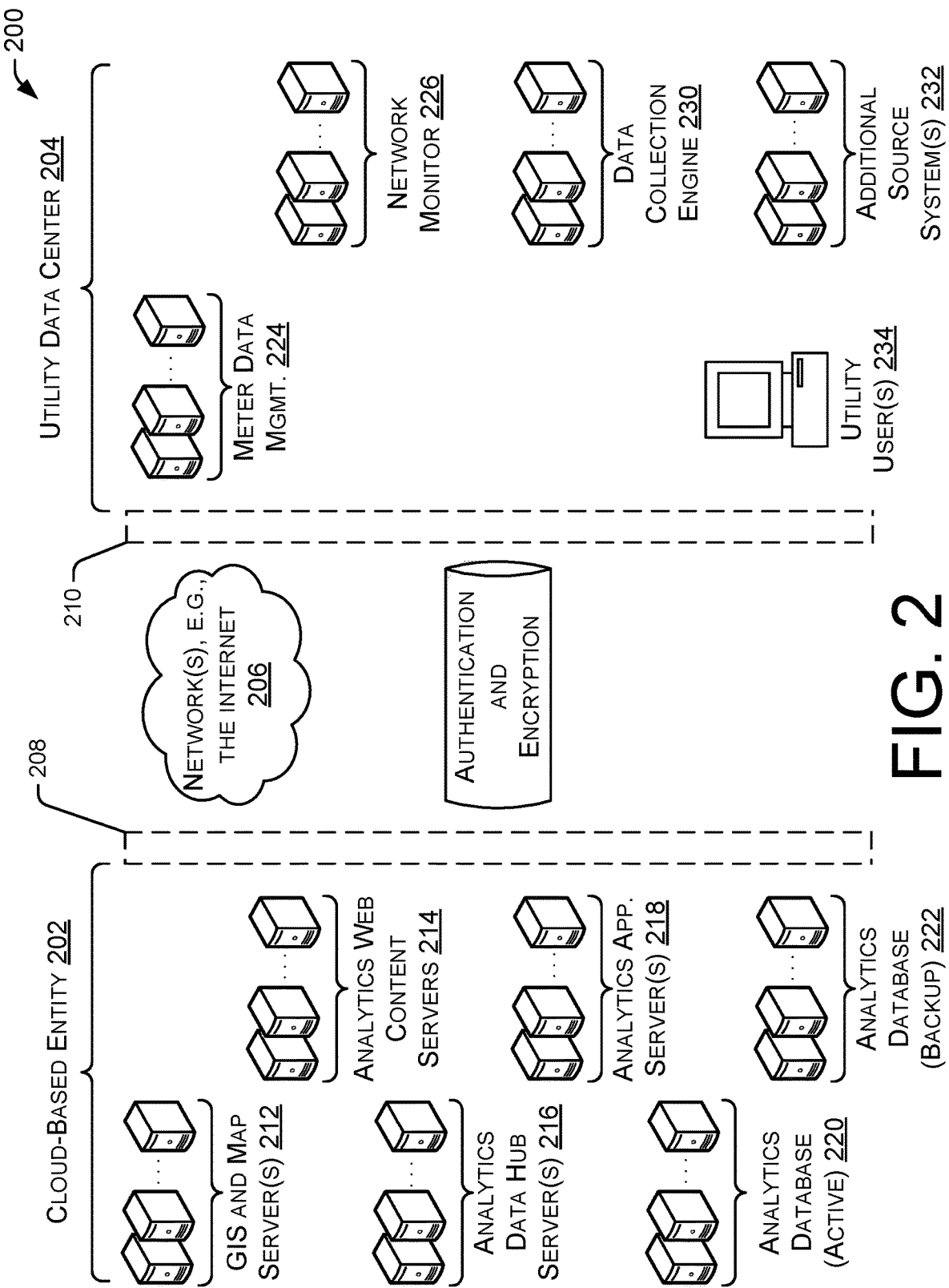
FIG. 2 is a block diagram showing a second example relationship between a cloud-based entity and a utility company data center.

FIG. 2 shows a second example system 200 including a cloud-based entity 202 that provides services to a utility data center 204 that may be on-premises at a customer. In the example shown the company or cloud-based or "hub" server(s) 216 communicates with the customer or utility data center server(s) 204 over a network 206, such as the internet. The cloud-based entity 202 and the data center 204 utilize respective firewalls 208, 210.

In the example shown, the cloud-based serves 202 provides services to the utility data center 204 by operation of a number of tools resident on one or more servers. One or more of servers 212-222 and/or applications running on the servers may, if needed, send a command through analytics data hub server 216, to an agent operating on the utility data center 204. Such commands may instruct the agent to perform certain tasks and/or to provide certain data to the hub 216.

Graphical information services (GIS) and map servers 212 may manage mapping data, and may read mapping data from of the analytics database 220, at least some of which was obtained by the hub 216 after receiving data from one or more agents. Analytics web content servers 214 may be used to determine and/or locate information on the internet or other locations. Also, servers 214 may communicate with analytics application server 218.

Analytics data hub server 216 is configured to communicate with a plurality of agents operating on the utility data center 204. The hub server 216 may receive commands from the analytics application server 218 (which may have originated from other servers) and relay the commands to appropriate agents. Similarly, the hub server 216 may relay results from the agents to the analytics application server 218, such as for distribution to other servers, as appropriate. Due to the interaction with the agents, the hub server 216 may provide data to the analytics applications server 218, which may provide appropriate data to servers 212, 214, 220 and 222. Analytics database 220 actively provides data to other servers, as needed and/or upon request. Analytics database 222 functions as a backup to the database(s) 220.

In the example shown, the utility data center server 204 may include a number of functions, which may be distributed among one or more servers. In the example shown, an IEE meter data management server 224 is configured to receive and store consumption data measured by electrical meters. A network monitor server 226 may be used to monitor and optimize network traffic, such as the traffic on a mesh or star network formed by a plurality of electric meters and/or data collecting devices. An analytics manager and/or data agents server 228 may operate a plurality of agents available to respond to commands sent by the applications running on server 218 of the hub 202. A data collection engine 230 may be configured to collect data from a network. In a utility industry application, the data may include resource consumption data. In a retail, wholesale or manufacturing application, the data may be related to products, materials, locations, etc. Additional source systems 232 may provide additional functionality as required by any particular installation or system. Utility users 234 may be able to access portions of the system, as required. Example utility users include IT professionals and others.

Figure 3:
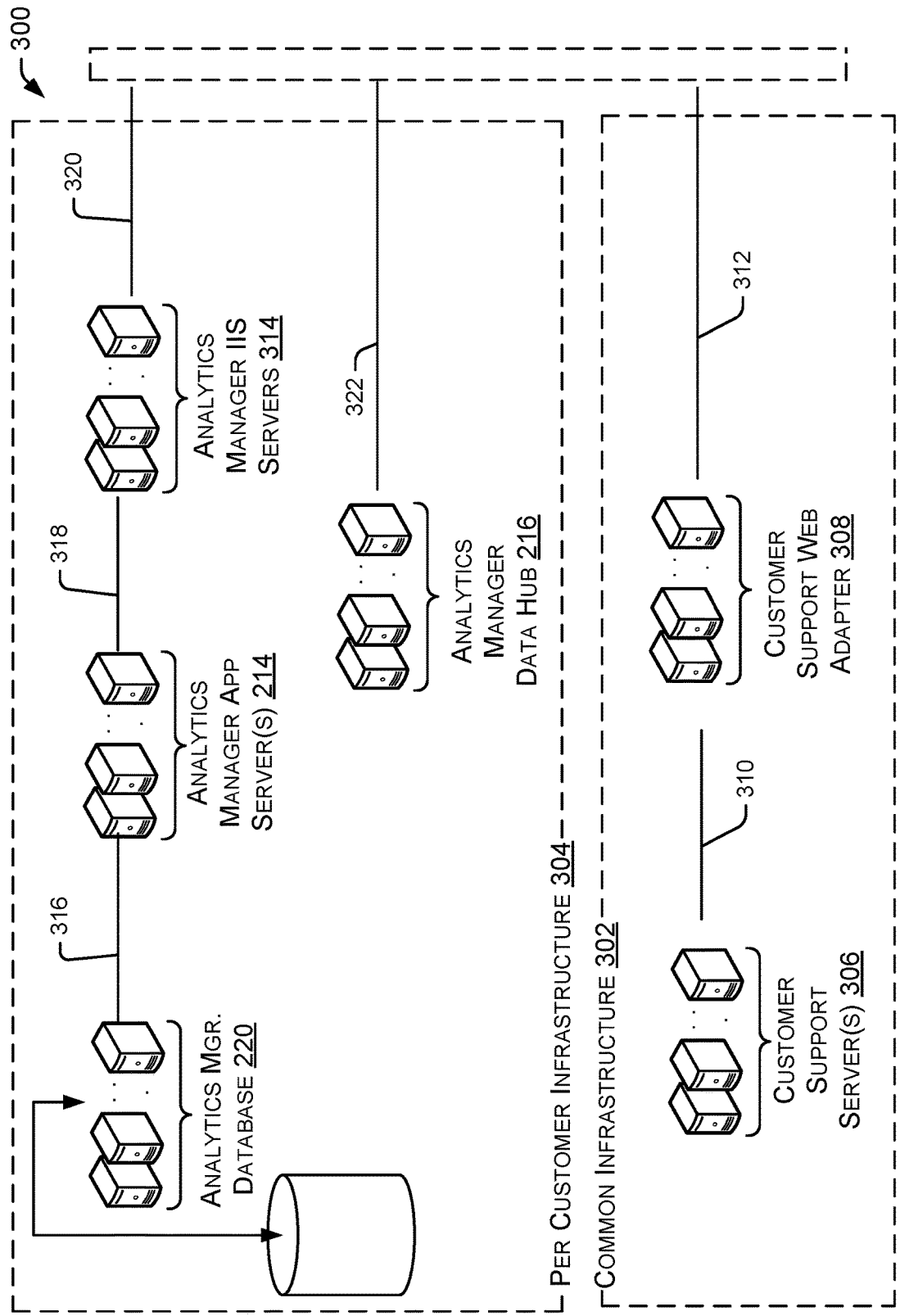
FIG. 3 is a block diagram showing an example structure of a cloud-based entity configured for interactions with at least one customer data center.

FIG. 3 shows an example structure of a cloud-based entity 300 configured for interactions with at least one customer data center. A common infrastructure 302 supports multiple customers, while a per-customer infrastructure 304 is configured to separately operate for each customer.

The example common infrastructure 302 may include customer support server(s) 306 and customer support web adapter servers 308. Communication 310 between the customer support server(s) 306 and customer support web adapter servers 308 may be based on TCP/6080 or other technology. Communication 312 by the customer support web adapter servers 308 may be based on TCP/80 Public or other technology.

The per customer infrastructure 304 may include an analytics manager database 220, an analytics manager application server 214 and/or an analytics manager IIS server(s) 314. Communication 216, 318 between the analytics manager database 220 and the analytics manager application server 214 may be performed by various technologies, as indicated by particular design requirements or conveniences. In the example shown, the analytics manager IIS servers 314 communicate 320 through the firewall using TCP/80/443 Public or other technology. An analytics manager data hub 216 may communicate 322 through the firewall using TCP/443 Public or other technology.

Accordingly, in the example shown, each customer would have a dedicated hub server 216. While this is not required, it advantageously segregates the functionality of each customer. The use of customer identifications (IDs) may allow a plurality of customers to be served by one data hub server. In either configuration, the data hub server 216 communicates with other computer(s) locally, and provides an interface for these computer(s) to send commands to, and receive data from, remotely located agents operating on customers' computers behind their respective firewall.

Example Hub-and-Agent Techniques

Both the hub and the agent may be multithreaded, to thereby allow the agent to execute multiple commands simultaneously. Also, the hub may be capable of communicating with the same agent regarding multiple commands, and/or communicate with multiple agents, simultaneously. This can be accomplished by addition of a session or command identifier (ID) to the protocol. Whenever a command is started, it may be assigned a globally unique identifier (GUID) from the originator, which in almost all cases the hub. The command ID is used whenever the hub and agent communicate back and forth to ensure all traffic/data for that command is together. This is a type of multiplexing and works well over WebSockets and other transport mechanisms. Even if only one pipe is used, many commands can be in transit at the same time without scrambling of the commands, responses, data, etc.

In some example systems, more than one instance of the hub running in the cloud helps to make a hub system more reliable. Multiple hubs can be accomplished by a slight modification to the protocol. When an agent first connects to the hub, or as it's checking its health by pinging the hub, the hub can respond with additional information including the address of backup hubs the agent can use in case the backup hub if it cannot connect to the current hub. For best reliability, backup hubs should be geographically distributed and the agent should round robin (or otherwise switch) between hubs.

In some example systems, agent(s) advertise their capabilities. This can be accomplished by a slight modification to the protocol. When an agent first connects to a hub it can send a list of commands it supports to the hub.

In some example systems, the hub does not rely on a single backend data store, since this is a single point of failure. The hub may use a distributed voting algorithm, such as Paxos, the family of protocols for solving consensus in a network of unreliable devices, to allow for leader election and allow the leader to resolve any conflicts between the different local data stores of each hub.

In some example systems, agents have the ability to buffer data transferred to the hub. The internet may be unreliable; accordingly, agents may buffer any data being sent to the hub. In the cases where the agent is in the middle of transferring data to the hub and the internet goes out, the agent may use the buffer to finish sending the data once the internet is back up. This can easily be accomplished by the agent saving any data to a file on disk and deleting it only when the data successfully makes it to the hub.

In some example installations, customers are not comfortable with the cost, performance and/or reliability of the cloud. For this reason, the technologies involved in such installations should require minimal commitment to a single strategy. Technology should be selected that will work in multiple environments and/or installations. The hub and agents should not only run in a cloud or a hosted environment, but for those customers not comfortable with the cloud, the hub and agent functionality should also run on their hardware and behind their firewall.

For best use of resources at the company, the hub should allow a large number of agents to be connected to a large number of customers. In this way the hub should be multi-tenant. This can be accomplished by making a few modifications. First, a customer or tenant ID may be added to the protocol. This ID may be added to some or all commands and responses. Also, in high volume installations, with many customers, the hub will have many incoming connections. Accordingly, some or all of the backup hubs mentioned earlier may be configured as active hubs. Such a configuration will allow for any hub to connect with any agent, to route commands and data between the cloud and customers. Accordingly, the hubs may communicate with each other to route messages to appropriate respective hubs and to associate messages, hubs and customers. In an example, the routing can be accomplished by having each hub store a local routing table that maps hubs, customers, agents, requirements and capabilities. These tables may be synchronized using a voting algorithm, such as Paxos.

In some example installations, the hub may be secured in the cloud/hosted facility and controlled by the company. Security may include the ability to configure a list of acceptable agent client certificates and associate customers and certificates in the multi-tenant case. Such certificates and associations will allow for the hub to only allow a specific customer to receive that customer commands. Accordingly, it will not be possible, due to such a security arrangement, for one customer to receive another customer's command even if there is a bug in the routing code. It will also not be possible for one customer to receive a response or data from another customer B. Since the hub only trusts a certain list of certificates, unauthenticated or malicious users will be prevented from connecting to the hub.

In some example installations, operation (at the customer's location) of multiple agents capable of doing the same command may provide additional reliability for the customer. This will require that agents each have a unique ID so they can be addressed by the Hub uniquely. This ID should be a GUID and generated on the first run of any agent. The agent should then store this unique GUID and use it whenever connecting to the hub. This will allow for the hub uniquely address agents with the same capabilities. Using multiple agents configured to do the same command will allow the hub to perform parallel execution of commands and/or split commands into jobs and execute the jobs in parallel on the two agents. In the event of failure of an agent, control may fail over to a second agent in response to the failure. The can also round robin call (or otherwise sequence) the agents for load balancing.

In some example installations, agents may be secured at the customer's site and controlled by the customer. Security should include the ability to configure a list of acceptable hub server certificates and addresses for the company's hub. This will allow for the customer to completely control who the agents are allow to connect to. This makes sure that no man-in-the-middle attack can happen wherein some bad actor is trying to impersonate the company. To further strengthen the customer's security, each agent may provide the ability to list what commands it is capable of so that the customer can select a subset of the available commands and further restrict the capabilities of the agent.

In some example installations, agents and their commands may be decoupled, so that commands are just plugins into the agent. This allows for agents to be packed with any desired commands, and allows new commands to be added without having to rebuild the agent. An agent that allows commands to be easily added and/or removed also provides the flexibility to be reconfigured to change as the devices to which the commands are destined changes. For small devices, a few commands targeted to that device may be packed into the agent. For larger devices, more commands may be packed into the agent, but much of the core agent logic may remain the same. As the commands within any agent are changed, a digital certificate provided by the company for each command may be used, so that the agent, and the customer, can trust any new commands.

Example Supported Messaging Patterns

A remote procedure call (RPC) may include a pattern involving a small request payload (the command) from the hub and then a small response payload (the result of the command) from an agent. Request and responses may be buffered in memory to optimize speed. Such procedure calls may be very useful in many situations, but they do not cover all scenarios so more messaging patterns are needed.

A streaming remote procedure call may include a pattern involving a small request payload (the command) from the hub and then a very large resulting payload (e.g., potential several GB worth of data from an agent). This is very similar to the RPC, except that for optimization reasons, usually an RPC request and responses are buffered in memory. This may not be practical for a response comprising streaming data, which may be too large and for that reason a special case messaging pattern may be used wherein the response is not buffered.

A subscriptions (or trickle) pattern may involve a small request payload (the command) from the hub that sets a long running subscription to some sensor, aggregation, calculation, service, database, etc., to which the agent has access. As new records/readings come in to the agent or the agent detects a change in something it's watching like a database, file system, calculation, etc., it "trickles" that subscription data back to the hub.

A real-time pattern may blur a distinction between a request and a response. The hub and agents are able to send messages to each other in real time in a single unique session. This can piggy back off the command or session ID introduced earlier. The real-time pattern may allow for many advanced techniques, such as a feedback loop, etc., between the hub and agents. It also allows for real time updates to dashboards and backend databases. This feature can be used for a wide variety of advance scenarios.

A scheduled pattern may be identical to an RPC, except that the request payload send from the hub includes a schedule of when the agent should run the command. It can be a single run schedule that just delays a command to some future date or it can be a recurring schedule where in the command is executed several times. In the case where the schedule is executed multiple times, a special type of parameter may be introduced. A relative parameter may be a relative offset to the scheduled time so that the command can take into account when it was scheduled to run as part of its process.

Agent deployment server(s) may be configured at the customer. This server may be configured to allow the customer to control the deployment of new agents with new commands to their devices. All security and approvals required to deploy new agents with new capabilities may be controlled by the customer on the customer's premises.

An agent distribution server may exist at the company. This server may be configured to allow the company to make new agents, with new commands, available to customers. The agent distribution server may not actually deploy or install any agents; instead, it may make agents available for the customer to download if desired.

The agent deployment server at the customer may stay in communication with the agent distribution server at the company. Such communication may allow the agent deployment server to make new agents, with new capabilities, available to the customer new agents. The customer can then decide to approve/reject the deployment of the new agents to their devices using the deployment server. If approved, the deployment server will download the new agent from the distribution server and then upload the new agent to any required devices.

The hub and agents should have the ability to roll keys or certifications. This can be accomplished by the hub and each agent having at least two key/cert slots (in the case of certs this would be the intermediate or root authority). Using this technique, one key can be used to send down a new key to the second slot. This allow for keys to be rolled while maintaining security.

Example Distributed, Non-Hub, Systems

As discussed, FIG. 2 shows a hub server 216 in communication with a plurality of agents in a utility data center 204. As discussed, the agents may be located centrally in the data agent server 228, or may be distributed within other servers in a manner that associates agents with the applications with which they are most likely to communicate. Similarly, the functionality of the hub server 216 could be decentralized, so that applications in any server 212 through 222 could communicate with agents running on servers in the data center 204. As an example, an application running on the GIS and map server 212 could send a command to an agent related to network topology or device connectivity.

Example Methods

In some examples of the techniques discusses herein, the methods of operation may be performed by one or more application specific integrated circuits (ASIC) or may be performed by a general purpose processor utilizing software defined in computer readable media. In the examples and techniques discussed herein, the memory may comprise computer-readable media and may take the form of volatile memory, such as random access memory (RAM) and/or non-volatile memory, such as read only memory (ROM) or flash RAM. Computer-readable media devices include volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device.

As defined herein, computer-readable media does not include transitory media, such as modulated data signals and carrier waves, and/or signals.

Figure 4:
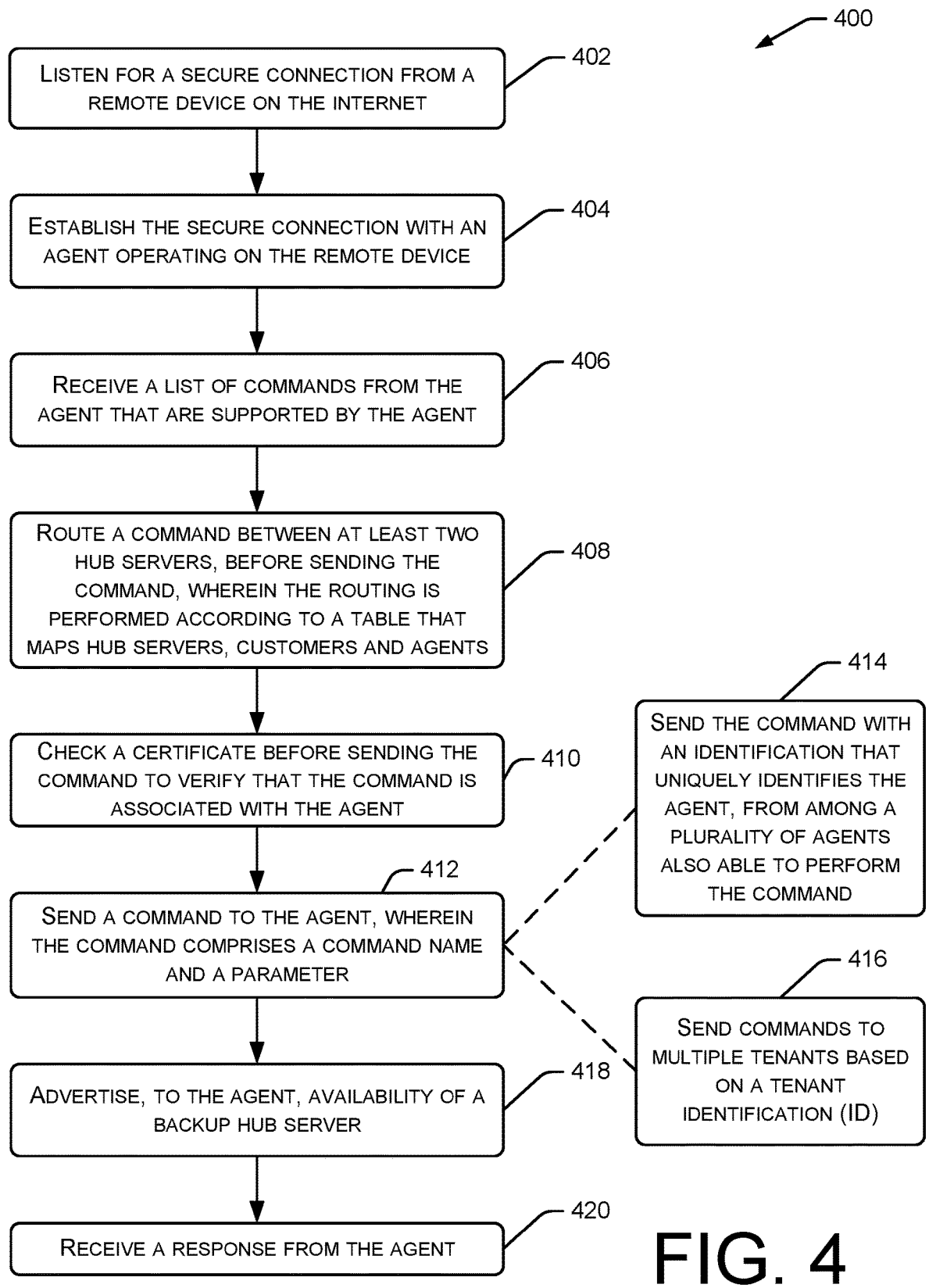
FIG. 4 is a flow diagram showing example actions taken by a hub server (e.g., in a location on the cloud) in its communication with an agent on a remote server behind a firewall (e.g., on a computing device on-premises at a customer site).

FIG. 4 flow diagrams showing an example processes which are representative of techniques used by a hub to send commands to an agent on a remote server behind a firewall. The processes may, but need not necessarily, be implemented in whole or in part by the systems 100, 200 and/or 300 described with respect to FIGS. 1-3.

At block 402, an application listens for a secure connection from a remote device on the internet. In the context of the system of FIG. 2, an application running on the hub server 216 listens for an agent, such as an agent operable on the agent server 228.

At block 404, a secure connection with an agent operating on the remote device is established. In the example of FIG. 1, WebSockets provides a secure connection between the agent on the remote server and the hub server.

At block 406, the hub server may receive a list of commands from the agent over the secure connection. The list, sent by the agent, shows commands that are supported by the agent, and therefore available to the hub server (and applications on other servers that are served by the hub server).

At block 408, in some systems having more than one hub server, a command sent to one hub server is routed between to at least one other hub server, before the command is sent to the agent. The routing may be performed according to a table that maps hubs, customers and agents.

At block 410, the hub server may check a certificate before the command is sent. The certificate may be used to verify that the command is associated with the agent. The verification process helps to assure that agents receive only appropriate commands.

At block 412, the hub server may send a command to the agent. The command may include a command name and a parameter. At block 414, in some systems, the command may be sent to the agent with an identification that uniquely identifies the agent. This is useful when a number of agents may also be configured and able to perform the command. At block 416, in some systems, commands may be sent to multiple tenants based on a tenant identification (ID). Thus, a hub server may be configured to send commands to a number of customers of the company that operates the hub server. To clarify and verify that the command is appropriately sent, a tenant (customer) ID may be used.

At block 418, in some systems, the hub server may advertise to the agent that a backup hub server is available. This will provide the agent with other options, such as if the connection between the agent and hub server goes down.

At block 420, the hub server receives a response, from the agent, to the command sent to the agent. The response may include a success code, requested data or information, etc.

Figure 5:
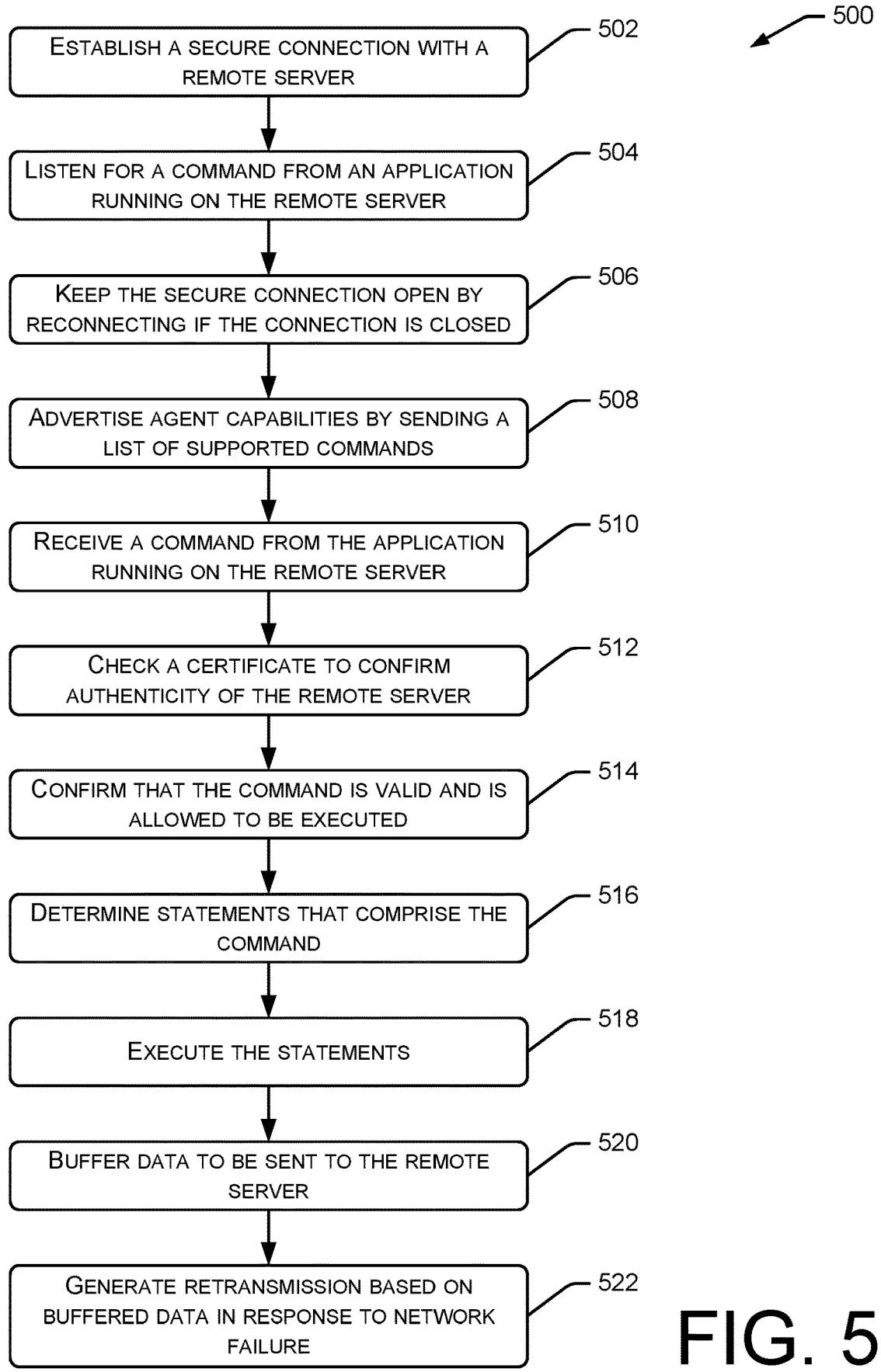
FIG. 5 is a flow diagram showing example actions taken by an agent operating a computing device (e.g., on-premises server at a customer site) and in communication with hub server located on the cloud.

FIG. 5 is a flow diagram showing an example processes that are representative of techniques used by an agent to respond to commands sent by a remote server. The processes may, but need not necessarily, be implemented in whole or in part by the systems 100 and/or 200 described with respect to FIGS. 1-3.

At block 502, the agent establishes a secure connection with a remote server is established.

At block 504, the agent listens for a command from an application running on the remote server.

At block 506, the agent keeps the secure connection open, such as by reconnecting if the connection is closed.

At block 508, the agent may advertise its capabilities by sending a list of supported commands.

At block 510, the agent receives a command from the application running on the remote server (e.g., the hub server 216 of FIG. 2).

At block 512, the agent checks a certificate to confirm authenticity of the remote server.

At block 514, the agent confirms that the command is valid and is allowed to be executed.

At block 516, the agent determines statements that comprise the command.

At block 518, the agent executes the statements.

At block 520, the agent may buffer data to be sent to the remote server.

At block 522, the agent transmits a result of the executed command to the hub server. If there is an error in the transmission, or a network failure, the agent uses the buffered data in a retransmission.

Example Hub (Company) Server and Data Agent (Customer) Server

Figure 6:
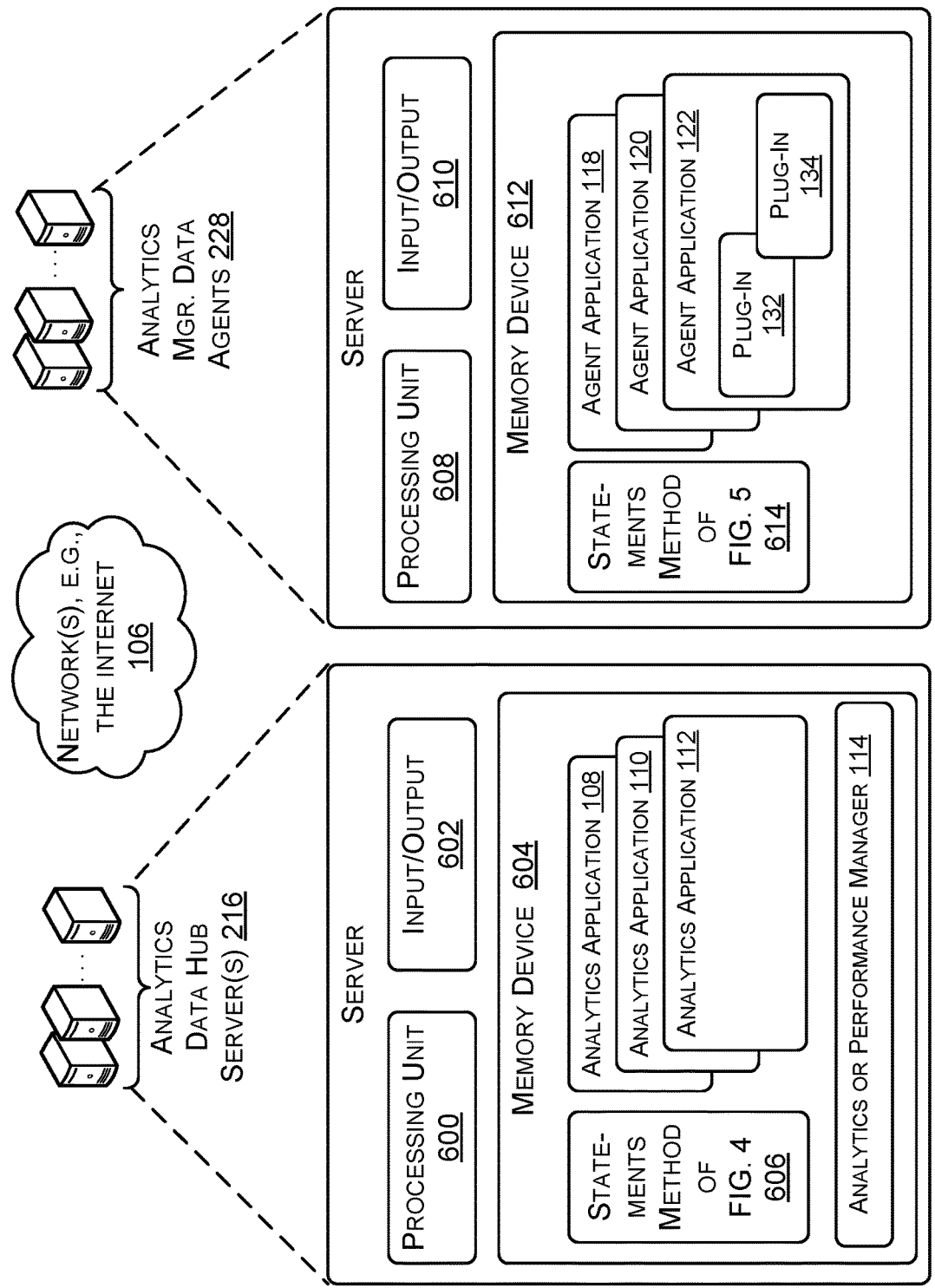
FIG. 6 is a block diagram showing an example hub server and an example agent server.

FIG. 6 is a block diagram showing an example structure of the hub server 216 and the data agent server 228. The hub server 216 includes a processor 600, input/output 602 and memory 604. The processor 600 is configured to execute statements, including but not limited to, statements to execute the method 400 of FIG. 4, whose implementing statements 606 may reside on memory 604. The input/output 602 is configured with at least one port. The port(s) allow the server 216 to host one or more URLs and to allow agents operable on server 228 to communicate with the hub server at those locations to establish a secure connection, such as by use of WebSockets or other technology. The hub server 216 may host a number of URLs (e.g., in the format https://localhost/remoteSQL) that can be used to represent different types or families of commands. The families of commands may correspond to families of agents residing on the data agent server 228, which carry out the commands by execution of plug-ins 132, 134 or other structures. Various analytics applications 108-112 and managers 114 may reside on memory 604, as well as an operating system and other software, as is known. The applications, or other applications running on other servers, may send the hub server 216 commands to be passed on to the appropriate agent on the data agent server 228.

The analytics server 228 includes a processor 608, input/output 610 and a memory 612. The processor 608 is configured to execute statements, including but not limited to, statements to execute the method 500 of FIG. 5, whose implementing statements 614 may reside on memory 612. The input/output 610 is configured with at least one port. The port(s) allow agents operable on server 228 to communicate with the hub server 216 using WebSockets or other technology. A number of agents 118-122 may operate on the data agent server 228. Each agent may have one or more plug-ins 132, 134. The agents contact the hub server 216 at an appropriate URL hosted by the hub server and establish a secure connection. The agents 118-122 then listen for commands sent by the hub server 216. When a command is received, the agent performs the command and may return a result to the hub server 216.

CONCLUSION

Although the subject matter has been described in language specific to structural features and/or methodological acts, it is to be understood that the subject matter defined in the appended claims is not necessarily limited to the specific features or acts described. In an example, while the customer computer has been referred to as "on-premises," such computers could be cloud-based. Accordingly, such computers and servers are "on-premises" in a virtual or logical sense, rather than in a physical sense. Accordingly, these and other specific features and acts are disclosed as exemplary forms of implementing the claims.

What is claimed is:

1. A method of communicating with agents through a firewall, comprising:
   associating each of a plurality of uniform resource locators (URLs) with a respective type of command, and associating each type of command with a respective type of agent, and associating a first URL with a first type of agent and a second URL with a second type of agent;
   listening for a request to form a secure connection using the first URL with a first agent operating on a remote device on the internet;
   establishing the secure connection with the first agent operating on the remote device in response to the request;
   sending a command to the agent, wherein a type of the command is compatible with a type of command associated with the first URL, wherein the command requests resource consumption data to be obtained by the agent, wherein the command passes through the firewall to the agent behind the firewall, wherein the command comprises a command name and a parameter, wherein the command comprises a format other than a structured query language (SQL) command, and wherein the command is configured to cause execution of a SQL command by the agent; and
   receiving a response from the agent, wherein the response comprises the resource consumption data.

2. The method of claim 1, wherein:
   the command is sent by a hub server to the first agent; and
   the hub server advertises, to the first agent, availability of a backup hub server.

3. The method of claim 1, additionally comprising:
   receiving a list of commands from the first agent that are supported by the first agent, wherein the list of commands does not include SQL commands.

4. The method of claim 1, wherein sending the command comprises:
   checking a certificate before sending the command to verify that the command is associated with the first agent.

5. The method of claim 1, additionally comprising:
   routing the command between at least two hub servers, before sending the command, wherein the routing is performed according to a table that maps hub servers, customers and agents.

6. The method of claim 1, wherein:
   the command is sent by a hub; and
   the hub is a multi-tenant hub configured to send commands to multiple tenants based on a tenant identification (ID).

7. The method of claim 1, wherein sending the command comprises:
sending the command with an identification that uniquely identifies the first agent, from among a plurality of agents also able to perform the command.

8. The method of claim 1, wherein sending the command comprises:
sending a remote Web Service command.

9. The method of claim 1, wherein sending the command comprises:
sending the command comprises sending a representational state transfer (REST) command to provide interoperability between the remote device and a second computing device on the internet.

10. The method of claim 1, wherein sending the command comprises:
sending a remote file transfer command that allows only transfer of files located in folders on the remote device allowed by the first agent.

11. The method of claim 1, wherein sending the command comprises:
sending a remote WebHooks command.

12. The method of claim 1, wherein sending the command comprises using at least one of:
a Java script object notation (JSON) format;
a JSON-based remote Web Service using XML and a simple object access protocol (SOAP) schema;
a JSON-based representational state transfer (REST);
a remote file transfer using a file name in a directory controlled by the first agent; or
WebHooks to subscribe to data changes behind a REST service.

13. A method of communicating with agents through a firewall, comprising:
associating each of a plurality of uniform resource locators (URLs) with a respective type of command, and associating each type of command with a respective type of agent, and associating a first URL with a first type of agent and a second URL with a second type of agent;
establishing a secure connection using the first URL with a first agent operating on a remote device, wherein the establishing comprises providing a certificate and using a web address that is on a list of acceptable certificates and addresses maintained by the agent;
receiving a list of commands from the agent that are a subset of commands that are supported by the agent;
selecting a command from the list of commands;
sending the command, selected from the list of commands, to the agent, wherein a type of the command is compatible with a type of command associated with the first URL, wherein the command requests resource consumption data to be obtained by the agent, wherein the command passes through the firewall to the agent behind the firewall, and wherein the command comprises a command name and a parameter; and
receiving a response from the agent, wherein the response comprises the resource consumption data.

14. The method of claim 13, wherein:
the command is sent by a hub server to the first agent; and
the hub server advertises, to the first agent, availability of a backup hub server.

15. The method of claim 13, wherein sending the command comprises:
checking the certificate before sending the command to verify that the command is associated with the first agent.

16. The method of claim 13, additionally comprising:
routing the command between at least two hub servers, before sending the command, wherein the routing is performed according to a table that maps hub servers, customers and agents.

17. The method of claim 13, wherein:
the command is sent by a hub; and
the hub is a multi-tenant hub configured to send commands to multiple tenants based on a tenant identification (ID).

18. The method of claim 13, wherein sending the command comprises:
sending the command with an identification that uniquely identifies the first agent, from among a plurality of agents also able to perform the command.

19. A method of communicating with agents through a firewall, comprising:
associating each of a plurality of uniform resource locators (URLs) with a respective type of command, and associating each type of command with a respective type of agent, and associating a first URL with a first type of agent and a second URL with a second type of agent;
establishing a secure connection over one of the plurality of URLs with an agent operating on a remote device;
receiving a list of commands from the agent that are a subset of commands that are supported by the agent;
selecting a command from the list of commands, wherein the command comprises a format other than a structured query language (SQL) command, and wherein the command is configured to cause execution of a SQL command by the agent;
sending the command to the agent, wherein a type of the command is compatible with a type of command associated with the first URL, wherein the command requests resource consumption data to be obtained by the agent, wherein the command passes through the firewall to the agent behind the firewall, and wherein the command comprises a command name and a parameter; and
receiving a response from the agent, wherein the response comprises the resource consumption data.

20. The method of claim 19, wherein sending the command comprises:
sending the command configured as a Java script or as an XML script for execution as a SQL command.

* * * * *